United States Patent
Schultze et al.

(10) Patent No.: US 7,924,888 B2
(45) Date of Patent: Apr. 12, 2011

(54) METHOD FOR EXCHANGING DATA BETWEEN STATIONS FROM DIFFERENT NETWORKS

(75) Inventors: Stephan Schultze, Lohr am Main (DE);
Jens Reckwell, Lohr am Main (DE);
Klaus Goldbach, Lohr am Main (DE);
Clemens Atzmueller, Gemuenden (DE);
Thilo Reick, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 363 days.

(21) Appl. No.: 11/573,007

(22) PCT Filed: Oct. 19, 2005

(86) PCT No.: PCT/EP2005/011213
§ 371 (c)(1),
(2), (4) Date: Jan. 31, 2007

(87) PCT Pub. No.: WO2006/048118
PCT Pub. Date: May 11, 2006

(65) Prior Publication Data
US 2009/0028191 A1  Jan. 29, 2009

(30) Foreign Application Priority Data

Oct. 29, 2004  (DE) .......................... 10 2004 052 555

(51) Int. Cl.
*H04J 3/06* (2006.01)
(52) U.S. Cl. ..................... 370/509; 370/356; 370/503
(58) Field of Classification Search .................. 370/352, 370/356, 503, 509
See application file for complete search history.

(56) References Cited

U.S. PATENT DOCUMENTS

| 5,774,377 | A | 6/1998 | Eidson | |
|---|---|---|---|---|
| 6,282,192 | B1 * | 8/2001 | Murphy et al. | 370/352 |
| 6,347,084 | B1 * | 2/2002 | Hulyalkar et al. | 370/347 |
| 6,845,416 | B1 * | 1/2005 | Chasmawala et al. | 710/107 |
| 7,103,513 | B2 | 9/2006 | Maier et al. | |
| 2003/0217155 | A1 * | 11/2003 | Greck et al. | 709/227 |
| 2004/0062278 | A1 * | 4/2004 | Hadzic et al. | 370/503 |
| 2005/0268019 | A1 * | 12/2005 | Chang Chien et al. | 710/305 |

FOREIGN PATENT DOCUMENTS

WO  03/060617  7/2003

* cited by examiner

*Primary Examiner* — Huy D Vu
*Assistant Examiner* — Benjamin Lamont
(74) *Attorney, Agent, or Firm* — Michael J. Striker

(57) ABSTRACT

The invention relates to a method for exchanging data between stations or nodes (111, 121, 122, 123, 131, 132, 133, 141, 142, 143) from different realtime capable networks (120, 130, 140) and from non-realtime capable networks (110). To this end, data is generated in a realtime capable network (120, 130, 140), a time stamp is added, and at least two of the realtime capable networks (120, 130, 140) are synchronized with one another. The invention also relates to a method for exchanging data between stations or nodes (111, 121, 122, 123, 131, 132, 133, 141, 142, 143) from realtime capable networks (120, 130, 140) and from non-realtime capable networks (110), during which trigger signals of different stations (111, 121, 122, 123, 131, 132, 133, 141, 142, 143), particularly from different networks (110, 120, 130, 140) are combined or linked.

11 Claims, 3 Drawing Sheets

METHOD FOR EXCHANGING DATA BETWEEN STATIONS FROM DIFFERENT NETWORKS

The present invention relates to a method for exchanging data between stations or nodes of real-time capable and non-real-time capable networks, devices for carrying out these methods, a corresponding computer program, and a computer program product.

RELATED ART

The significance of networks and network services has increased continually in recent times. The public is mainly interested in their use as a communication platform, e.g., the Internet. In the industrial sector, however, networks are also used to link control and automation systems with each other.

A basic distinction can be made between real-time capable networks and non-real-time capable networks. In non-real-time capable networks, the data in the network are transmitted depending on the available capacity. The data exchange is neither continuous nor periodic, which makes it difficult to estimate the expected signal transmit times and network occupancies.

In contrast, real-time capable networks have a deterministic time response. As such, it is possible to transmit data periodically and within certain time intervals, as is required, e.g., for sampled values in a control system.

In the field of control and automation engineering in particular, non-real-time networks—e.g., Ethernet networks to which computers are connected—are often connected with real-time capable networks, e.g., industrial field busses.

The non-real-time networks often serve as higher-level systems that perform the control, monitoring, diagnosis, etc., of the lower-level, real-time capable networks or systems.

To monitor the operating sequences or events in general in the real-time capable systems, it is often necessary to relate the data from these systems to each other in terms of time in the higher-level system. This cannot be easily accomplished in the related art, however, because the higher-level system does not have real-time capability.

In order to relate decentrally recorded data (e.g., diagnostic information, sampled data, etc.) to each other, the valid time stamp of the higher-level system is traditionally added, in the higher-level system, to the diagnostic information at the instant when the data is received. The time stamp varies depending on the data transmission time and the speed at which a diagnostic event is detected.

As a further possibility, the time bases of the individual, lower-level systems are set by a higher-level system, e.g., once or in a cyclic manner. The time base that is distributed is inexact or asynchronous, due to the transmission time of the time information.

A method is disclosed in U.S. Pat. No. 5,774,377 with which a time stamp is added to the data from a first station, and the data are stored in a buffer memory of the first station until a second station that has a synchronized time base with the first station detects a trigger event and communicates the point in time of this event to the first station. In response, the first station stores data—the time stamp of which is located within a predetermined range around the time point of the trigger event—in a long-term memory, for analysis at a later point in time.

When data from stations in lower-level networks are recorded in a controlled sampling method (e.g., an oscilloscope function), all of these stations must be triggered simultaneously. This is nearly impossible in the higher-level network, since transmission is not carried out in real time.

It is also difficult to link or combine simultaneous events that occur in different stations at one central point if this point is located in a non-real-time capable network.

If this linking of events is intended to trigger a process in the higher-level system, or to serve as a trigger for various stations in the lower-lower systems, for example, this is made difficult by the fact that events that occur simultaneously in different lower-level networks are not detected simultaneously in the higher-level system and cannot be related to each other.

The present invention therefore provides two methods for exchanging data between stations from different networks, two devices that use these methods, and a corresponding computer program and a computer program product according to the independent claims. Advantageous embodiments result from the particular subclaims and the description, which follows.

ADVANTAGES OF THE INVENTION

With the first inventive method for exchanging data between stations or nodes of at least two real-time capable networks and at least one non-real-time capable network, in the case of which a time stamp is added to data generated in a real-time capable network, at least two of the real-time capable networks are time-synchronized with each other. This makes it possible to easily relate the data from the time-synchronized networks to each other in terms of time.

Advantageously, the data provided with a time stamp are transmitted to a station in a non-real-time capable network. This station is therefore enabled to easily process or evaluate the data it receives in terms of time.

It is advantageous when, with the inventive method, data provided with a time stamp and received from different transmitters—from different networks in particular—are related to each other in terms of time by the receiver.

According to a particularly preferred embodiment of the inventive method, all real-time capable networks are time-synchronized with each other. This makes it possible to relate the data from all stations in real-time capable networks to each other directly in terms of time.

In a particularly advantageous manner, the inventive method is used in automation systems, particularly in motion-control systems and numerical control systems. When applied in automation engineering in particular, the method described makes it possible to implement real-time data acquisition in all stations and independently of control. The data can be, e.g., diagnostic data that are recorded over the long term and that are related to each other in terms of time, or they can be, e.g., process data that are generated over the short term and are used to search for errors using logic analysis or oscilloscope functions.

With the second inventive method for exchanging data between stations or nodes from at least two real-time capable networks and at least one non-real-time capable network, trigger signals from different stations—from different networks in particular—are combined or linked. They can be linked, e.g., using the generally known logic operators (AND, OR, etc.), or in any other manner. This makes it possible to monitor events across all networks.

With the second inventive method, the combination of trigger signals is advantageously transmitted as a new trigger signal to stations from different networks in particular. This makes it possible to easily use the combination of events that have occurred to trigger any pre-determinable operating sequence.

In a preferred embodiment of the second inventive method, a time stamp is added to the trigger signals that are generated in a real-time capable network, and at least two of the real-time capable networks are time-synchronized with each other. This is a particularly preferred, advantageous combination of the two inventive methods.

In a particularly preferred manner, the inventive method is used in automation systems, particularly in motion-control systems and numerical control systems. This makes it possible, for the first time, to advantageously combine triggering events from all stations and independently of control.

According to the present invention, a first device is provided for exchanging data between stations or nodes of real-time capable networks and non-real-time capable networks that includes means for adding time stamps to data generated in a real-time capable network, and means for time-synchronizing real-time capable networks.

It is also advantageous when the first inventive device also includes means for carrying out additional method steps according to a preferred embodiment of the first inventive method.

The second inventive device for exchanging data between stations or nodes of real-time capable networks and non-real-time capable networks includes means for combining or linking trigger signals from different stations, particularly from different networks. This device can also be easily added to existing networks.

Advantageously, the second inventive device also includes means for carrying out additional method steps according to a preferred embodiment of the second inventive method.

In a preferred embodiment, one of the inventive devices is used in automation systems, particularly in motion-control systems and numerical control systems.

The inventive computer program with program code means is designed to carry out all steps of one or both inventive methods when this computer program is run on a computer or a corresponding arithmetic unit, i.e., one of the inventive devices in particular.

The inventive computer program product with program code means, which are stored on a computer-readable data storage device, is provided to carry out one or both of the inventive methods when this computer program is run on a computer or a related arithmetic unit, i.e., one of the inventive devices in particular.

Further advantages and embodiments of the present invention result from the description and the attached drawing.

It is understood that the features mentioned above and to be described below can be used not only in the combination described, but also in other combinations or alone, without leaving the framework of the present invention.

The present invention is depicted schematically with reference to an exemplary embodiment in the drawing, and it is described in detail below with reference to the drawing.

DESCRIPTION OF THE FIGURES

The advantageous application of the inventive method in automation systems, particularly in motion-control systems and numerical control systems, is described below. The method is not limited to this application, however.

Figure 1:
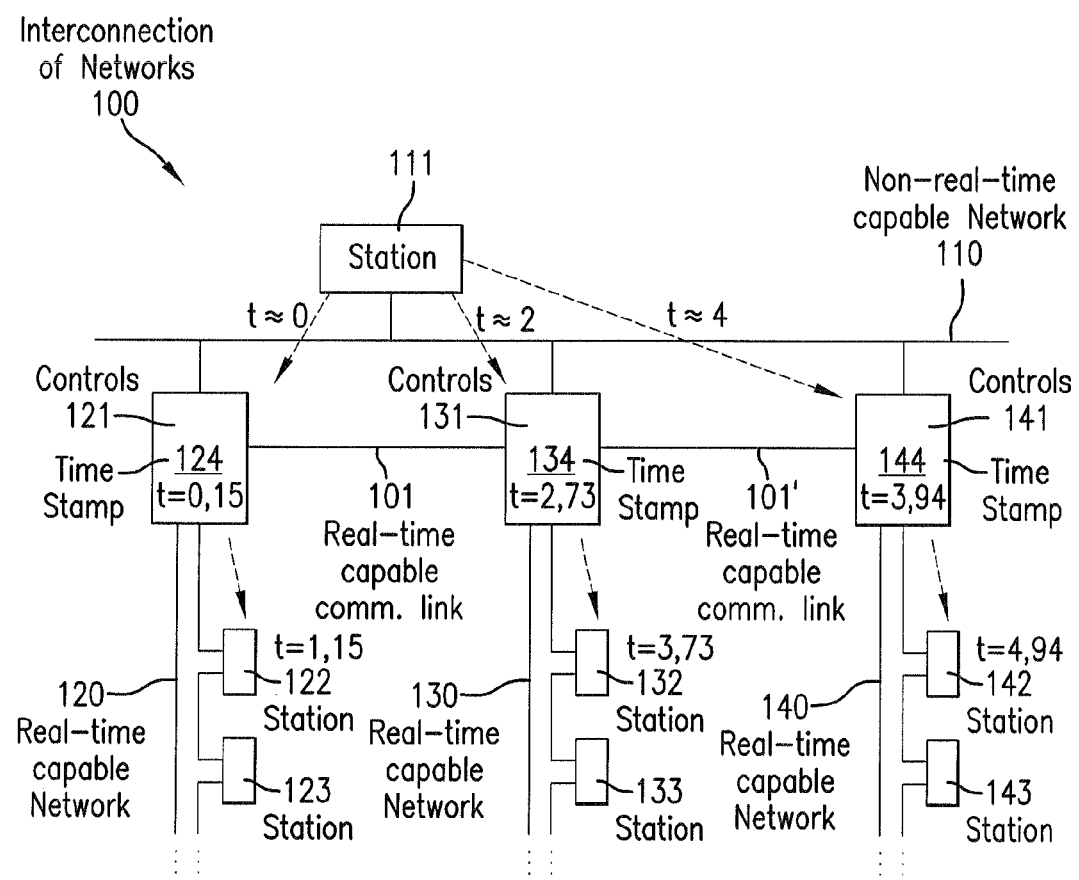
FIG. 1 is a schematic depiction of a data exchange according to a preferred embodiment of the inventive method.

An interconnection of different networks is labeled as a whole with reference numeral 100 in FIG. 1. A higher-level, non-real-time capable network 110 is connected with three lower-level, real-time capable networks 120, 130, 140. The three real-time capable networks 120, 130, 140 have the same time base, which is synchronized via real-time capable communication link 101, 101'. The synchronization can also be carried out, e.g., via non-real-time capable network 110. Non-real-time capable network 110 includes a station 111, e.g., a PC.

Real-time capable networks 120, 130, 140 are designed as control systems. They each include a controller or a stored program control (an "SPC") 121, 131, 141, to each of which additional stations 122, 123; 132, 133; 142, 143, e.g., sensors or actuators, are connected via real-time capable links.

Once the method is implemented, the aim is to now trigger the three lower-level systems to retrieve diagnostic data. PC 111 sends the trigger signal to controls 121, 131, 141 via non-real-time capable network 110. Due to the non-real-time connection, the time it takes for the signals to reach the controls is indeterminate.

As soon as a trigger signal reaches a control 121, 131, 141, this control 121, 131, 141 starts to record data. Since the transit time of the trigger signals from PC 111 to controls 121, 131, 141 differs, data recording also starts at different points in time.

Controls 121, 131, 141 now provide their data with a valid time stamp 124, 134, 144, e.g., when the measurement starts. Since the time sequence of a measurement—a measurement over ten units of time in the current example—is known, time stamp 124, 134, 144 can also be added at any other point in time, e.g., at the end or in the middle of a measurement. It is understood that a time stamp could also be added to the data in any unit of time.

The transit times between individual stations 121, 122, 123; 131, 132, 133; 141, 142, 143 in a network 120, 130, 140 are determinate and known. In the current example, the transit time between the individual stations is exactly one unit of time.

Figure 2:
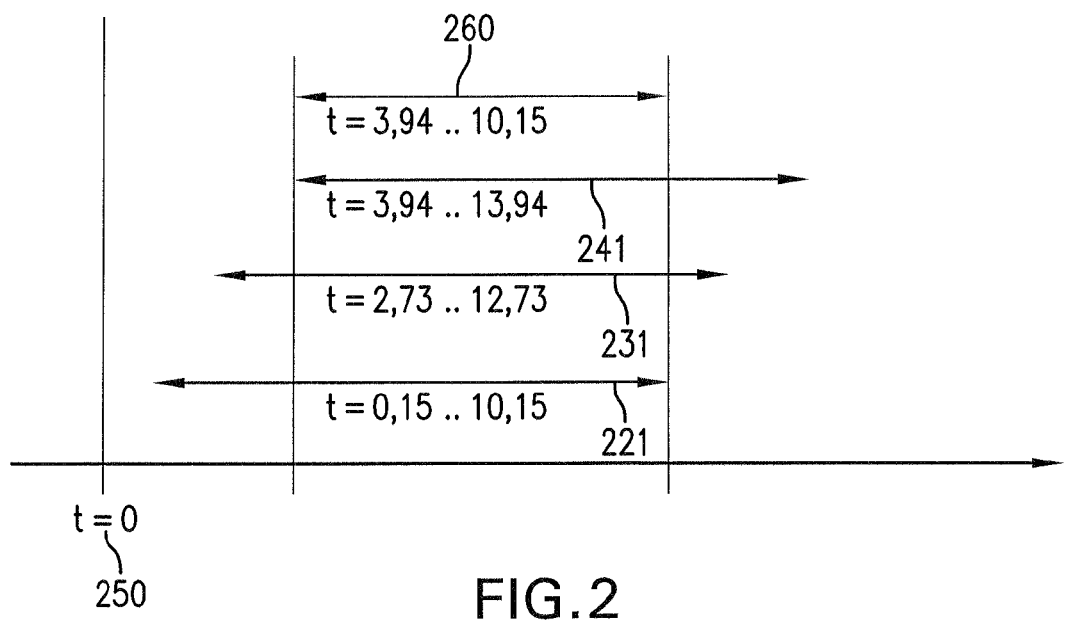
FIG. 2 is a schematic depiction of the diagnostic data obtained using the embodiment of the method described in FIG. 1.

The result of the method described in FIG. 1 is depicted in FIG. 2. A recording period of ten units of time was selected. When time equals zero 250, the trigger signals are sent to controls 121, 131, 141. In response, each of the three controls sends a data record 221, 231, 241 for period of time t. Each data record includes at least one time stamp. This time stamp indicates when the measurement started and ended.

Data record 221 from first control 121 starts at point in time "0.15 time units", and ends at point in time "10.15 time units". Data record 231 from second control 131 starts at point in time "2.73 time units", and ends at point in time "12.73 time units". Data record 241 from third control 141 starts at point in time "3.94 time units", and ends at point in time "13.94 time units".

The determinate time stamps make it possible to relate the individual data records to each other in terms of time. Based on the example shown, it is possible to identify an overlapping time interval 260 between points in time "3.94 time units" and "10.15 time units". During this time period 260, the measurements were carried out simultaneously in the various lower-level networks. This time interval 260 can be used, advantageously, to evaluate the data.

Figure 3:
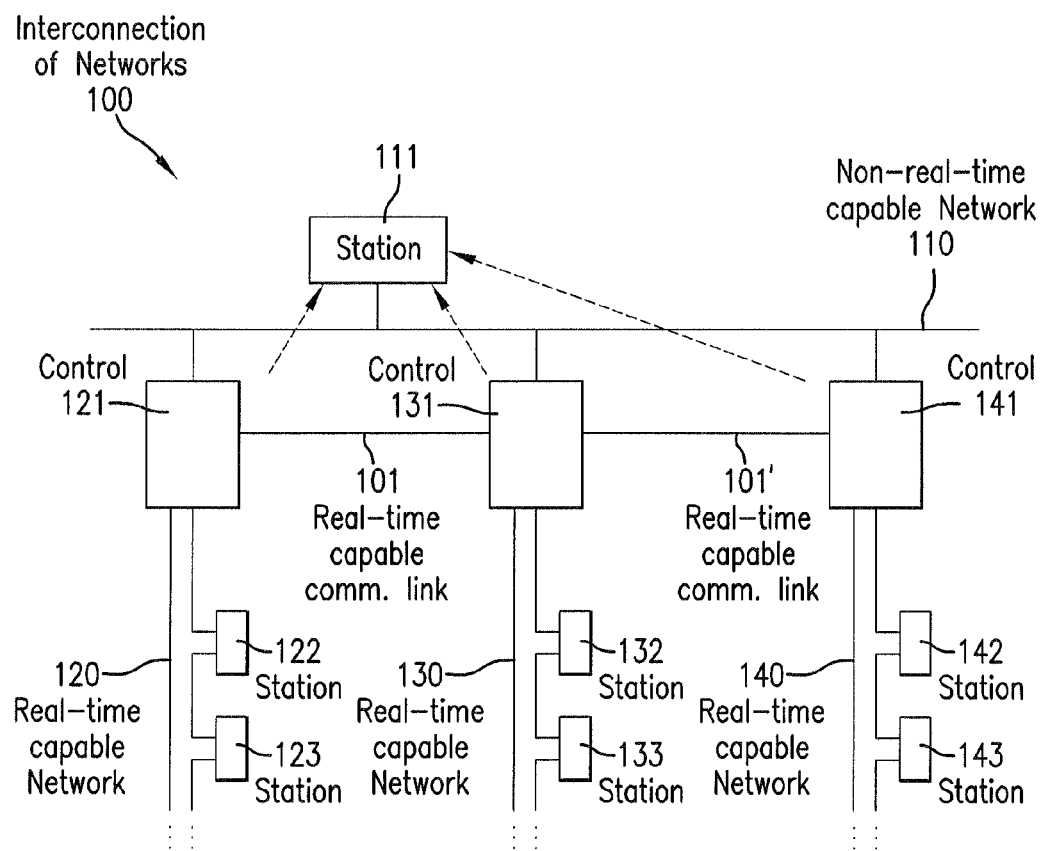
FIG. 3 is a schematic depiction of a data exchange according to another preferred embodiment of the inventive method.

FIG. 3 shows a further preferred embodiment of the inventive method.

An interconnection of different networks is labeled as a whole with reference numeral 100. A higher-level, non-real-time network 110 is connected with three lower-level, real-time networks 120, 130, 140. The three real-time capable networks 120, 130, 140 have the same time base, and it is synchronized, e.g., via real-time capable communication link 101, 101'. Non-real-time capable network 110 includes a station 111, e.g., a PC.

Real-time capable networks 120, 130, 140 are designed as control systems. They each include a controller or an SPC 121, 131, 141, to each of which additional stations 122, 123; 132, 133; 142, 143, e.g., sensors or actuators, are connected via real-time capable connections.

Once the method is implemented, the aim is to now identify a predetermined combination of several trigger conditions from different networks. If a trigger condition exists in a lower-level network, it is reported to PC 111. When several trigger events occur in various networks 120, 130, 140, PC 111 can now identify an interrelationship and the occurrence of the predetermined, linked trigger condition.

If the objective is to determine when the trigger events occur simultaneously, the trigger event can be provided with a time stamp and reported to PC 111.

What is claimed is:

1. A method for exchanging data between stations or nodes, comprising the following steps:
    providing at least two real-time capable networks and at least one non-real-time capable network, wherein said at least one non-real-time capable network is a higher level network, external to the stations or nodes, and configured to control, monitor, or diagnose lower-level networks, said lower-level networks being real-time capable networks;
    adding a time stamp to data generated in a real-time capable network;
    time-synchronizing at least two of the real-time capable networks with each other, wherein said at least two of the real-time capable networks have a common time base; and
    synchronizing said common time base via a real-time capable communication link,
    wherein the at least two real-time capable networks are industrial field buses, wherein said at least two real-time capable networks are control systems and includes at least one controller or stored program control (SPC), wherein said at least one non-real-time capable network comprises an Ethernet network connectable to at least one personal computer, and
    wherein said method is used in an automation system in the form of a motion-control system or a numerical control system.

2. The method as recited in claim 1, wherein data provided with a time stamp are transmitted to a station in a non-real-time capable network.

3. The method as recited in claim 1, wherein data provided with a time stamp and received from different transmitters, in particular from different networks are brought into a time relationship with each other by the receiver.

4. The method as recited in claim 1, wherein all real-time capable networks are time-synchronized with each other.

5. A computer readable data storage device recorded with a computer program with program code means for carrying out all steps of a method described in claim 1 when the program is run on a computer or a corresponding arithmetic unit.

6. A method for exchanging data between stations or nodes from at least two real-time capable networks and at least one non-real-time capable network, comprising the following steps:
    combining or linking trigger signals from different stations, particularly from different networks, with each other;
    time-synchronizing at least two of the real-time capable networks with each other, wherein said at least two of the real-time capable networks have a common time base, wherein said at least one non-real-time capable network is a higher level network, external to the stations or nodes, and configured to control, monitor, or diagnose lower-level networks, said lower-level networks being real-time capable networks; and
    synchronizing said common time base via a real-time capable communication link, wherein the at least two real-time capable networks are industrial field buses, wherein said at least two real-time capable networks are is control systems and include at least one controller or stored program control (SPC), wherein said at least one non-real-time capable network comprises an Ethernet network connectable to at least one personal computer, and
    wherein said method is used in an automation system in the form of a motion-control system or a numerical control system.

7. The method as recited in claim 6, wherein the combination of trigger signals is transmitted, as a new trigger signal, to stations, particularly from different networks.

8. The method as recited in claim 6, wherein a time stamp is added to the trigger signals that are generated in a real-time capable network.

9. A device for exchanging data between stations or nodes from real-time capable networks and non-real-time capable networks with a common time base configured to add time stamps to data generated in a real-time capable network, comprising:
    communication link configured to synchronize real-time capable networks, wherein at least two of the real-time capable networks have a common time base, and wherein said common time base is configured to be synchronized via a real-time capable communication link, wherein said at least one non-real-time capable network is a higher level network, external to the stations or nodes, and configured to control, monitor, or diagnose lower-level networks, said lower-level networks being real-time capable networks, wherein the at least two real-time capable networks are industrial field buses, wherein said at least two real-time capable networks are control systems and includes at least one controller or stored program control (SPC), wherein said at least one non-real-time capable network comprises an Ethernet network connectable to at least one personal computer, and
    wherein said device is configured for use in an automation system in the form of a motion-control system or a numerical control system.

10. The device as recited in claim 9 with means for transmitting data provided with a time stamp to a station in a non-real-time capable network.

11. The device as recited in claim 9 with means for exchanging data between stations or nodes from at least two real-time capable networks and at least one non-real-time capable network, wherein trigger signals from different stations from different networks, are combined or linked with each other.

* * * * *